United States Patent
Zong et al.

(10) Patent No.: US 11,778,446 B2
(45) Date of Patent: Oct. 3, 2023

(54) GATE DRIVING UNIT, GATE DRIVING METHOD, GATE DRIVING CIRCUIT AND DISPLAY DEVICE

(71) Applicants: ORDOS YUANSHENG OPTOELECTRONICS CO., LTD., Inner Mongolia (CN); BOE TECHNOLOGY GROUP CO., LTD., Beijing (CN)

(72) Inventors: Shaolei Zong, Beijing (CN); Wei Sun, Beijing (CN); Jieqiong Wang, Beijing (CN); Jigang Sun, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

(*) Notice: Subject to any disclaimer, the term of this patent is extended or adjusted under 35 U.S.C. 154(b) by 183 days.

(21) Appl. No.: 17/444,826

(22) Filed: Aug. 10, 2021

(65) Prior Publication Data
US 2021/0377717 A1    Dec. 2, 2021

Related U.S. Application Data

(62) Division of application No. 16/561,941, filed on Sep. 5, 2019, now abandoned.

(30) Foreign Application Priority Data

Jan. 25, 2019  (CN) .......................... 201910073445.5

(51) Int. Cl.
*H04W 4/90*  (2018.01)
*G08B 6/00*  (2006.01)
(Continued)

(52) U.S. Cl.
CPC ................ *H04W 4/90* (2018.02); *G08B 6/00* (2013.01); *H04M 1/0202* (2013.01);
(Continued)

(58) Field of Classification Search
CPC ......... H04W 4/90; G08B 6/00; G08B 25/016; H04M 1/0202; H04M 2250/12;
(Continued)

(56) References Cited

U.S. PATENT DOCUMENTS 9,799,287 B2 * 10/2017 Qing .................... G09G 3/3648
10,818,255 B2 * 10/2020 Gu ....................... G06F 3/04166
(Continued)

FOREIGN PATENT DOCUMENTS

CN          106531052 A      3/2017
CN          106601176 A      4/2017
(Continued)

OTHER PUBLICATIONS

First Office Action for Chinese Application No. 201910073445.5, dated Aug. 4, 2021, 15 Pages.
First Office Action for U.S. Appl. No. 16/561,941, dated Apr. 6, 2020, 14 Pages.

*Primary Examiner* — David D Davis
(74) *Attorney, Agent, or Firm* — BROOKS KUSHMAN P.C.

(57) ABSTRACT

A gate driving unit includes an input terminal, a latch node control circuit, a first node potential maintenance circuit, and a latch node reset circuit, the latch node control circuit is configured to control a voltage of the latch node through a charging voltage inputted by the latch charging terminal under the control of an input signal provided by the input terminal, the first node potential maintenance circuit is configured to control the connection between the first node and the latch enable terminal under the control of a voltage of the latch node, to maintain a potential of the first node;

(Continued)

and the latch node reset circuit is configured to control to reset the potential of the latch node under the control of the latch node reset signal inputted by the latch node reset terminal.

14 Claims, 7 Drawing Sheets

(51) Int. Cl.
*H04M 1/02* (2006.01)
*G06F 3/041* (2006.01)
*G06F 3/044* (2006.01)

(52) U.S. Cl.
CPC .............. *G06F 3/041* (2013.01); *G06F 3/044* (2013.01); *G09G 2310/0267* (2013.01); *H04M 2250/12* (2013.01)

(58) Field of Classification Search
CPC .......... H04M 1/72454; H04M 1/72424; G06F 3/041; G06F 3/044; G09G 2310/0267; G09G 3/20
See application file for complete search history.

(56) References Cited

U.S. PATENT DOCUMENTS

| | | | |
|---|---|---|---|
| 2005/0272447 A1 | 12/2005 | Eckel | |
| 2009/0201260 A1 | 8/2009 | Lee et al. | |
| 2012/0028683 A1 | 2/2012 | Lee et al. | |
| 2012/0282878 A1 | 11/2012 | Amis | |
| 2013/0154998 A1 | 6/2013 | Yang et al. | |
| 2017/0309211 A1* | 10/2017 | Zhang | G09G 3/007 |
| 2017/0316732 A1 | 11/2017 | Na | |
| 2017/0364170 A1* | 12/2017 | Gu | G09G 3/36 |
| 2018/0190364 A1* | 7/2018 | Gu | G09G 3/3674 |
| 2019/0057637 A1 | 2/2019 | Fan et al. | |
| 2019/0129561 A1 | 5/2019 | Sun et al. | |
| 2019/0333595 A1* | 10/2019 | Zou | G11C 19/287 |

FOREIGN PATENT DOCUMENTS

| | | | | |
|---|---|---|---|---|
| CN | 107068088 A | | 8/2017 | |
| CN | 107452425 A | * | 12/2017 | ........... G09G 3/3677 |
| CN | 107452425 A | | 12/2017 | |
| CN | 107731187 A | | 2/2018 | |
| CN | 108288450 A | | 7/2018 | |
| CN | 108389545 A | | 8/2018 | |
| CN | 108573673 A | | 9/2018 | |

* cited by examiner

GATE DRIVING UNIT, GATE DRIVING METHOD, GATE DRIVING CIRCUIT AND DISPLAY DEVICE

CROSS-REFERENCE TO RELATED APPLICATIONS

This application is a Divisional of U.S. application Ser. No. 16/561,941, filed Sep. 5, 2019, which claims priority to Chinese Patent Application No. 201910073445.5 filed on Jan. 25, 2019, which are hereby incorporated herein by reference in their entireties.

TECHNICAL FIELD

The present disclosure relates to the field of display driving technology, in particular to a gate driving unit, a gate driving method, a gate driving circuit and a display device.

BACKGROUND

In the field of in-cell touch display, common electrodes are multiplexed in a time-division manner according to the touch distribution method, that is, Gate On Array (GOA, a gate driving circuit provided on an array substrate) includes a plurality of stages gate driving units that are turned on stage by stage, and then interrupt and enter a latch time period. The touch scanning is enabled in the latch time period. The common electrodes are multiplexed as touch electrodes, and the touch scanning are implemented for a plurality of rows, then a next display period is started. The process is repeated a plurality of times within one frame of display time. However, in this process, low self-holding capability of the potential of the first node of the GOA is a serious problem due to the leakage current of a thin film transistor (TFT). Especially in a high temperature environment, the leakage current of TFT will greatly reduce the potential self-holding capability of the first node of the GOA, so that in the latch time period, the potential of the first node of the gate driving unit at a breakpoint position included in the GOA cannot be maintained as a valid voltage, GOA cannot normally output the gate driving signal after the latch time period is finished and the next display period is started, and a display abnormality occurs at the breakpoint position.

SUMMARY

The present disclosure provides a gate driving unit including an input terminal, a latch node control circuit, a first node potential maintenance circuit, and a latch node reset circuit, wherein the latch node control circuit is respectively connected to a latch node, the input terminal, and a latch charging terminal, and is configured to control a voltage of the latch node through a charging voltage inputted by the latch charging terminal under the control of an input signal provided by the input terminal, the first node potential maintenance circuit is respectively connected to the latch node, a first node, and a latch enable terminal, and is configured to control the connection between the first node and the latch enable terminal under the control of a voltage of the latch node, to maintain a potential of the first node; and the latch node reset circuit is respectively connected to a latch node reset terminal and the latch node, and is configured to control to reset the potential of the latch node under the control of the latch node reset signal inputted by the latch node reset terminal.

In an embodiment of the present disclosure, the latch node control circuit includes a charge control circuit and a latch energy storage circuit; a first terminal of the latch energy storage circuit is connected to the latch node, and a second terminal of the latch energy storage circuit is connected to a first voltage terminal; the charging control circuit is respectively connected to the input terminal, the latch charging terminal, and the latch node, and is configured to control the connection between the latch charging terminal and the latch node under the control of the input signal, so as to charge the latch energy storage circuit through the charging voltage to control the voltage of the latch node.

In an embodiment of the present disclosure, the latch energy storage circuit includes a latch capacitor; the charge control circuit comprises a charge control transistor; a first end of the latch capacitor is connected to the latch node, and a second end of the latch capacitor is connected to the first voltage terminal; and a control electrode of the charging control transistor is connected to the input terminal, a first electrode of the charging control transistor is connected to the latch charging terminal, and a second electrode of the charging control transistor is connected to the latch node.

In an embodiment of the present disclosure, the first node potential maintenance circuit includes a potential maintenance transistor; a control electrode of the potential maintenance transistor is connected to the latch node, a first electrode of the potential maintenance transistor is connected to the latch enable terminal, and a second electrode of the potential maintenance transistor is connected to the first node.

In an embodiment of the present disclosure, the latch node reset circuit includes a latch node reset transistor; a control electrode of the latch node reset transistor is connected to the latch node reset terminal, a first electrode of the latch node reset transistor is connected to the latch node, and a second electrode of the latch node reset transistor is connected to the reset voltage terminal.

In an embodiment of the present disclosure, the latch charging terminal and the latch enabling terminal are a same terminal.

In an embodiment of the present disclosure, the gate driving unit further includes a gate driving signal output terminal, an energy storage circuit, an output circuit, a touch reset circuit, and a first node reset circuit, a first terminal of the energy storage circuit is connected to the first node, a second terminal of the energy storage circuit is connected to the gate driving signal output terminal, and the energy storage circuit is configured to control the potential of the first node; the output circuit is respectively connected to the first node, the gate driving signal output terminal and the first clock signal terminal, and is configured to control the connection between the gate driving signal output terminal and the first clock signal terminal under the control of the voltage of the first node; the touch reset circuit is respectively connected to the touch reset terminal, the gate driving signal output terminal and the reset voltage terminal, and is configured to control the connection between the gate driving signal output terminal and the reset voltage terminal under the control of the touch reset signal inputted by the touch reset terminal; and the first node reset circuit is respectively connected to a blank area reset terminal, the first node and the reset voltage terminal, and is configured to control the connection between the first node and the reset voltage terminal under the control of a blank area reset signal inputted by the blank area reset terminal.

In an embodiment of the present disclosure, the energy storage circuit includes a storage capacitor, the output circuit comprises an output transistor, the touch reset circuit comprises a touch reset transistor, and the first node reset circuit comprises a first node reset transistor; a first end of the storage capacitor is connected to the first node, and a second end of the storage capacitor is connected to the gate driving signal output terminal; a control electrode of the output transistor is connected to the first node, a first electrode of the output transistor is connected to the first clock signal terminal, and a second electrode of the output transistor is connected to the gate driving signal output terminal; a control electrode of the touch reset transistor is connected to the touch reset terminal, a first electrode of the touch reset transistor is connected to the gate driving signal output terminal, and a second electrode of the touch reset transistor is connected to the reset voltage terminal; and a control electrode of the first node reset transistor is connected to the blank area reset terminal, a first electrode of the first node reset transistor is connected to the first node, and a second electrode of the first node reset transistor is connected to the reset voltage terminal.

In an embodiment of the present disclosure, the gate driving unit further includes a first node control circuit, a second node control circuit, and an output reset circuit, wherein the first node control circuit is respectively connected to the first node, the input terminal, a reset terminal, a first scan voltage terminal, a second scan voltage terminal, a second node, and a second voltage terminal, and is configured to control the connection between the first node and the first scan voltage terminal under the control of the input signal, and control the connection between the first node and the second scan voltage terminal under the control of a reset signal inputted by the reset terminal, and control the connection between the first node and the second voltage terminal under the control of a voltage of the second node; the second node control circuit is respectively connected to the first node, the second node, a second clock signal terminal, a gate driving signal output terminal, and a second voltage terminal, and is configured to control a potential of the second node under the control a the second clock signal inputted by the second clock signal terminal, the voltage of the first node, and the gate driving signal outputted by the gate driving signal output terminal; and the output reset circuit is respectively connected to the second node, the gate driving signal output terminal and the second voltage terminal, and is configured to control the connection between the gate driving signal output terminal and the second voltage terminal under the control of the voltage of the second node.

An embodiment of the present disclosure provides a gate driving method applied to the gate driving unit, and a latch time period is provided between two adjacent display periods, the gate driving method includes: in the latch time period, controlling, by the latch node control circuit, the voltage of the latch node to a valid level by latching the charging voltage inputted by the charging terminal under the control of the input signal provided by the input terminal; controlling, by the first node potential maintenance circuit, the connection between the first node and the latch enable terminal to maintain the potential of the first node at a valid voltage under the control of the voltage of the latch node; and in the display period, controlling, by the latch node reset circuit, to reset the potential of the latch node under the control of the latch node reset signal inputted by the latch node reset terminal to control the potential of the first node potential maintenance circuit to disconnect the first node from the latch enable terminal.

In an embodiment of the present disclosure, the latch node control circuit includes a charging control circuit and a latch energy storage circuit, the controlling, by the latch node control circuit, the voltage of the latch node to a valid level by latching the charging voltage inputted by the charging terminal under the control of the input signal provided by the input terminal includes: controlling, by the charging control circuit, the connection between the latch charging terminal and the latch node under the control of the input signal, to charge the latch energy storage circuit through the charging voltage to control the voltage of the latch node to be a valid level.

In an embodiment of the present disclosure, the gate driving unit includes a gate driving signal output terminal and an output circuit, and the gate driving method further includes: in the latch period, controlling, by the output circuit, the connection between the gate driving signal output terminal and the first clock signal terminal under the control of the first node, so that the gate driving signal output terminal outputs an invalid level to control a gate line in a corresponding row to disable.

An embodiment of the present disclosure provides a gate driving circuit including A stages of the gate driving units; A is an integer greater than 1; a input terminal of an ath stage of gate driving unit is connected to a gate driving signal output terminal of an (a−1)th stage of gate driving unit; a is an integer less than or equal to A and greater than 1; an input terminal of a first stage of gate driving unit is connected to a start voltage terminal.

An embodiment of the present disclosure provides a display device including the gate driving circuit.

DETAILED DESCRIPTION

The technical solutions in the embodiments of the present disclosure will be described clearly and completely with reference to the drawings in the embodiments of the present disclosure, and it is obvious that the embodiments described are only some embodiments of the present disclosure, rather than all embodiments. All other embodiments, which can be derived by a person skilled in the art from the embodiments disclosed herein without making any creative effort, shall fall within the protection scope of the present disclosure.

The transistors used in all embodiments of the present disclosure may be transistors, thin film transistors, or field effect transistors or other devices with the same characteristics. In the embodiments of the present disclosure, to distinguish two electrodes of a transistor except for a control electrode, one electrode is referred to as a first electrode, and the other electrode is referred to as a second electrode.

In practical operation, for a transistor, the control electrode may be a base electrode, the first electrode may be a collector electrode, and the second electrode may be an emitter electrode. Alternatively, the control electrode may be a base electrode, the first electrode may be an emitter electrode, and the second electrode may be a collector electrode.

In practical operation, when the transistor is a thin film transistor or a field effect transistor, the control electrode may be a gate electrode, the first electrode may be a drain electrode, and the second electrode may be a source electrode. Alternatively, the control electrode may be a gate electrode, the first electrode may be a source electrode, and the second electrode may be a drain electrode.

Figure 1:
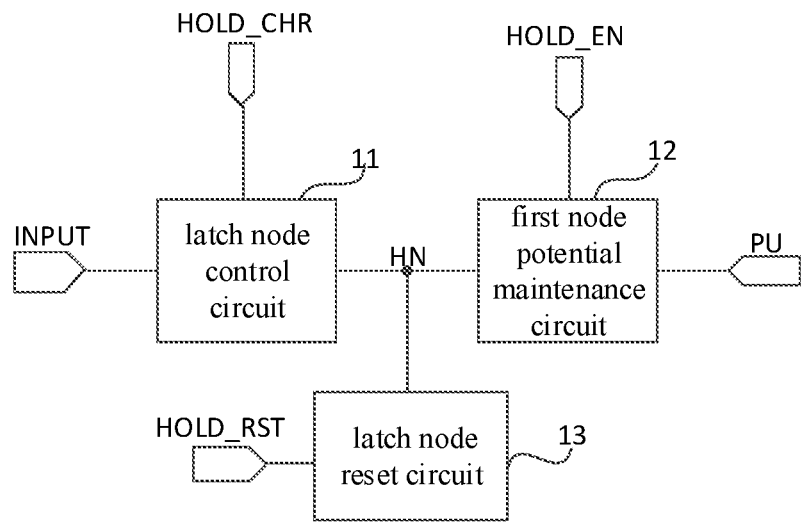
FIG. 1 is a structural diagram of a gate driving unit according to an embodiment of the present disclosure.

As shown in FIG. 1, the gate driving unit according to an embodiment of the present disclosure includes an input terminal INPUT, a latch node control circuit 11, a first node potential maintenance circuit 12, and a latch node reset circuit 13.

The latch node control circuit 11 is respectively connected to a latch node HN, the input terminal INPUT, and a latch charging terminal HOLD_CHR, and is used to controls the voltage of the latch node HN through the charging voltage inputted by the latch charging terminal HOLD_CHR under the control of the input signal provided by the input terminal INPUT.

The first node potential maintenance circuit 12 is respectively connected to the latch node HN, the first node PU, and a latch enable terminal HOLD_EN, and is used to control the connection between the first node HN and the latch enable terminal HOLD_EN under the control of the voltage of the latch node HN, to maintain a potential of the first node PU.

The latch node reset circuit 13 is respectively connected to a latch node reset terminal HOLD_RST and the latch node HN, and is used to control to reset the potential of the latch node HN under the control of the latch node reset signal inputted by the latch node reset terminal HOLD_RST.

The gate driving unit according to the embodiment of the present disclosure sets a latch time period between two adjacent display periods. The latch node control circuit 11 controls the voltage of the latch node HN to be a valid level through the charging voltage inputted by the latch charging terminal HOLD_CHR under the control of the input signal provided by the input terminal INPUT. The first node potential maintenance circuit 12 controls the connection between the first node PU and the latch enable terminal HOLD_EN under the control of the voltage of the latch node HN, to maintain the potential of the first node PU to be a valid voltage, so that in the latch time period, the potential of the first node PU can be maintained to be a valid voltage, the normal display may be implemented in the display period after the latch time period is finished. In the display period, the latch node reset circuit 13 controls to reset the potential of the latch node HN to control the first node potential maintenance circuit 12 to disconnect the first node PU from the latch enable terminals HOLD_EN, so as not to affect the normal display.

In specific implementation, one frame of display time may include at least two display periods, and a latch time period may be set between two adjacent display periods.

In actual operation, operations such as touch control and fingerprint recognition can be performed in the latching time period, and the latching time period is a GOA interruption time period.

In specific implementation, when a potential maintenance transistor included in the first node potential maintenance circuit 12 in the gate driving unit is an n-type transistor, the valid level may be a high level, but is not limited to this. When the potential maintenance transistor is a p-type transistor, the valid level may be a low level, but is not limited to this.

In a specific implementation, when an output transistor of the gate driving unit whose gate electrode is connected to the first node PU is an n-type transistor, the valid voltage may be a high voltage, and the invalid voltage may be a low voltage, but it is not limited to this. When the output transistor is a p-type transistor, the valid voltage may be a low voltage, and the invalid voltage may be a high voltage, but it is not limited to this.

The gate driving unit according to the embodiment of the present disclosure has a first node potential latch function, which can insert a breakpoint at any position in a plurality of stages of GOA units which are driven stage by stage, and latch the potential of the first node on the GOA unit at the breakpoint position, to ensure that the potential of the first node in the GOA unit at the breakpoint position is latched and maintained as a valid voltage, ensuring that the GOA unit can still perform display driving normally after a long interruption ends, so that the plurality of stages of GOA units are continuously driven normally stage by stage.

The embodiment of the present disclosure can provide a very stable time-division multiplexing solution for the common electrode in in-cell touch display products, that is, in the driving time period of the plurality of stages of GOA units driven stage by stage, the common electrode is used for display. In the latch time period (that is, the GOA interrupt time period), the common electrode is used for touch control, fingerprint recognition, and the like.

Specifically, the latch node control circuit may include a charge control circuit and a latch energy storage circuit.

A first terminal of the latch energy storage circuit is connected to the latch node, and a second terminal of the latch energy storage circuit is connected to a first voltage terminal. The charging control circuit is respectively connected to the input terminal, the latch charging terminal, and the latch node, and is configured to control the connection between the latch charging terminal and the latch node under the control of the input signal, so as to charge the latch energy storage circuit through the charging voltage to control the voltage of the latch node.

In actual operation, the first voltage terminal may be a low voltage terminal or a ground terminal, but is not limited to this.

In specific implementation, the latch node control circuit may include a charge control circuit and a latch energy storage circuit. The latch time period is set between two adjacent display periods, and the charging control circuit charges the latch energy storage circuit by the charging voltage under the control of the input signal, to control the voltage of the latch node to be a valid level.

Figure 2:
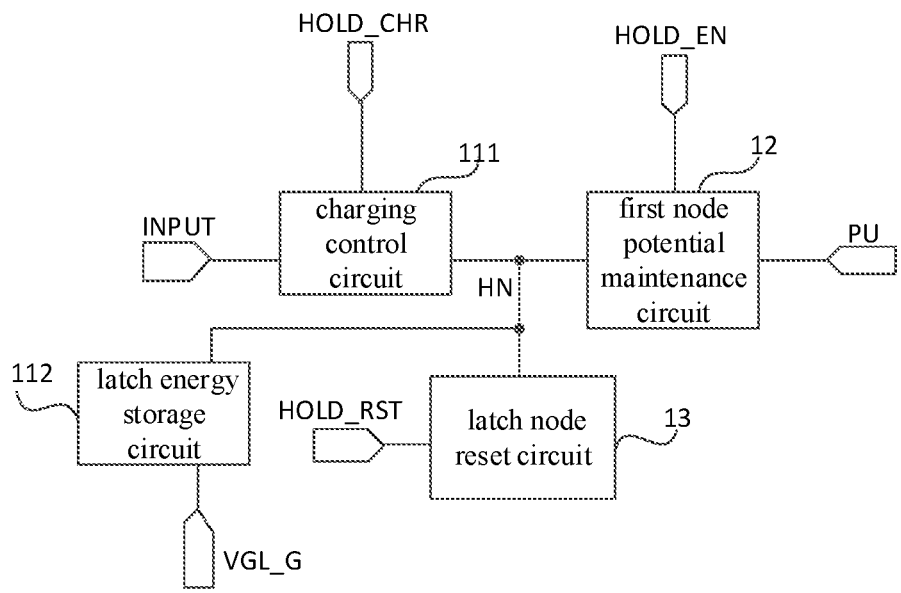
FIG. 2 is another structural diagram of a gate driving unit according to an embodiment of the disclosure.

As shown in FIG. 2, on the basis of the gate driving unit shown in FIG. 1, the latch node control circuit includes a charging control circuit 111 and a latch energy storage circuit 112.

The first terminal of the latch storage circuit 112 is connected to the latch node HN, and the second terminal of the latch storage circuit 112 is connected to a low voltage terminal; the low voltage terminal is used to input a low voltage VGL_G.

The charging control circuit 111 is respectively connected to the input terminal INPUT, the latch charging terminal HOLD_CHR, and the latch node HN, and is used to control the connection between the latch charging terminal HOLD_CHR and the latch node HN under the control of the input signal, to charge the latch storage circuit 112 through the charging voltage to control the voltage of the latch node HN.

In specific implementation, VGL_G is a GOA reference low potential.

In the latch time period set between two adjacent display periods, the charging control circuit 111 charges the latch energy storage circuit 112 through the charging voltage under the control of the input signal, to control the voltage of the latch node HN to be the valid level.

Specifically, the latch energy storage circuit may include a latch capacitor; the charge control circuit may include a charge control transistor.

A first end of the latch capacitor is connected to the latch node, and a second end of the latch capacitor is connected to the first voltage terminal.

A control electrode of the charging control transistor is connected to the input terminal, a first electrode of the charging control transistor is connected to the latch charging terminal, and a second electrode of the charging control transistor is connected to the latch node.

Specifically, the first node potential maintenance circuit may include a potential maintenance transistor.

A control electrode of the potential maintenance transistor is connected to the latch node, a first electrode of the potential maintenance transistor is connected to the latch enable terminal, and a second electrode of the potential maintenance transistor is connected to the first node.

Specifically, the latch node reset circuit may include a latch node reset transistor.

A control electrode of the latch node reset transistor is connected to the latch node reset terminal, a first electrode of the latch node reset transistor is connected to the latch node, and a second electrode of the latch node reset transistor is connected to the reset voltage terminal.

In specific implementation, the reset voltage terminal may be a low voltage terminal or a ground terminal, but is not limited to this.

The latch charging terminal and the latch enable terminal are the same terminal, so that the number of terminals can be reduced, which is beneficial to realize a narrow frame.

Figure 3:
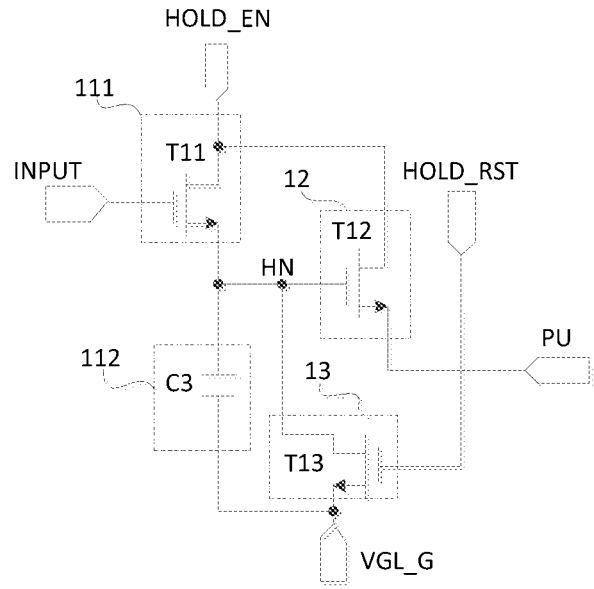
FIG. 3 is a circuit diagram of a gate driving unit according to an embodiment of the present disclosure.

As shown in FIG. 3, based on the gate driving unit shown in FIG. 2, the latch energy storage circuit 112 includes a latch capacitor C3; the charge control circuit 111 includes a charge control transistor T11.

A first end of the latch capacitor C3 is connected to the latch node HN, and a second end of the latch capacitor C3 is connected to a low voltage terminal; the low voltage terminal is used to input a low voltage VGL_G.

Agate electrode of the charge control transistor T11 is connected to the input terminal INPUT, a drain electrode of the charge control transistor T11 is connected to the latch enable terminal HOLD_EN, and a source electrode of the charge control transistor T11 is connected to the latch node HN.

The first node potential maintenance circuit 12 includes a potential maintenance transistor T12.

A gate electrode of the potential maintenance transistor T12 is connected to the latch node HN, a drain electrode of the potential maintenance transistor T12 is connected to the latch enable terminal HOLD_EN, and a source electrode of the potential maintenance transistor T12 is connected to the first Node PU.

The latch node reset circuit 13 includes a latch node reset transistor T13.

A gate electrode of the latch node reset transistor T13 is connected to the latch node reset terminal HOLD_RST, a drain electrode of the latch node reset transistor T13 is connected to the latch node HN, and a source electrode of the latch node reset transistor T13 is connected to the low voltage terminal; the low voltage terminal is used to input the low voltage VGL_G.

In the embodiment shown in FIG. 3, the latch charging terminal and the latch enable terminal are the same terminal.

In the embodiment shown in FIG. 3, T11, T12 and T13 are all n-type thin film transistors, but not limited to this.

When the gate driving unit of the present disclosure shown in FIG. 3 is in operation, in the latch period set between two adjacent display periods, HOLD_EN outputs a high level, HOLD_RST outputs a low level, and INPUT is connected the gate driving signal outputted by an adjacent previous stage of gate driving unit.

In the latch time period, when INPUT is connected to a high level, T11 is turned on, and C3 is charged through the high level outputted by HOLD_EN, so that the potential of HN is a high level, and T12 is turned on, to control HOLD_EN to connect to the first node PU, so that the potential of the first node PU is a high voltage.

In the latching time period, after INPUT is connected to a high level, INPUT is connected to a low level, T11 is turned off, the potential of HN is maintained at a high voltage by C3, and T12 continues to be turned on, to control HOLD_EN to connect to the first node PU, so that the potential of the first node PU is maintained at a high voltage after the latch period ends and when the next display period starts, the potential of the first node PU can be maintained at a high voltage to enable normal display driving.

When the gate driving unit of the present disclosure shown in FIG. 3 is in operation, in the display period, HOLD_EN outputs a low level, HOLD_RST outputs a high level, T13 is turned on, to open the discharge path of C3 to discharge C3 and reset the potential of the latch node HN so that the potential of the latch node HN is a low voltage, thereby controlling both T11 and T12 to be turned off. In the latch time period, HOLD_RST outputs a low level to control T13 to be turned off to close the discharge path of C3.

Specifically, the gate driving unit according to the embodiment of the present disclosure may further include a gate driving signal output terminal, an energy storage circuit, an output circuit, a touch reset circuit, and a first node reset circuit.

A first terminal of the energy storage circuit is connected to the first node, the second terminal of the energy storage circuit is connected to the gate driving signal output terminal, and the energy storage circuit is used to control the potential of the first node.

The output circuit is respectively connected to the first node, the gate driving signal output terminal and the first clock signal terminal, and is used to control the connection between the gate driving signal output terminal and the first clock signal terminal under the control of the voltage of the first node.

The touch reset circuit is respectively connected to the touch reset terminal, the gate driving signal output terminal and the reset voltage terminal, and is used to control the connection between the gate driving signal output terminal and the reset voltage terminal under the control of the touch reset signal inputted by the touch reset terminal.

The first node reset circuit is respectively connected to a blank area reset terminal, the first node and the reset voltage terminal, and is used to control the connection between the first node and the reset voltage terminal under the control of a blank area reset signal inputted by the blank area reset terminal.

In specific implementation, the reset voltage terminal may be a low voltage terminal or a ground terminal, but is not limited to this.

Figure 4:
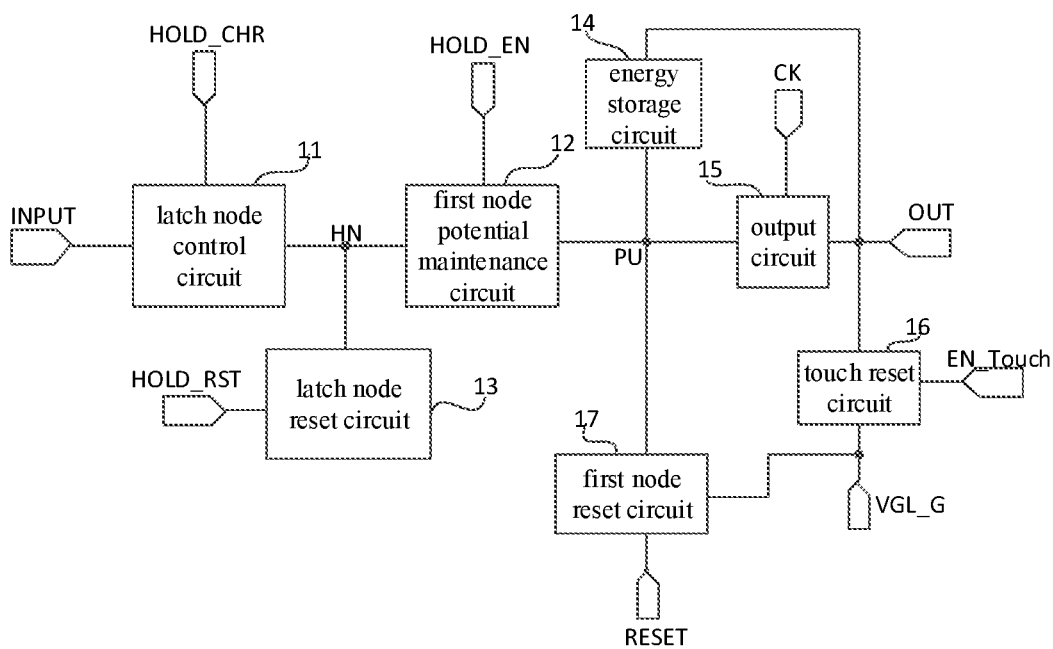
FIG. 4 is still another structural diagram of a gate driving unit according to an embodiment of the present disclosure.

As shown in FIG. 4, based on the gate driving unit shown in FIG. 1, the gate driving unit according to the embodiment of the present disclosure may further include a gate driving signal output terminal OUT, an energy storage circuit 14, an output circuit 15, a touch reset circuit 16, and a first node reset circuit 17.

The first terminal of the energy storage circuit 14 is connected to the first node PU, the second terminal of the energy storage circuit 14 is connected to the gate driving signal output terminal OUT, and the energy storage circuit 14 is used to control the potential of the first node PU.

The output circuit 15 is respectively connected to the first node PU, the gate driving signal output terminal OUT and the first clock signal terminal for inputting the first clock CK, and is used to control the connection between the gate driving signal output terminal OUT and the first clock signal terminal under the control of the voltage at the first node PU.

The touch reset circuit 16 is connected to the touch reset terminal EN_Touch, the gate driving signal output terminal OUT, and the low voltage terminal VGL_G for inputting a low voltage, respectively, is used to control the connection between the gate driving signal output terminal OUT and the low voltage terminal under the control of the touch control reset signal inputted by the touch reset terminal EN_Touch.

The first node reset circuit 17 is respectively connected to the blank area reset terminal RESET, the first node PU, and the low voltage terminal, and is used to control the connection between the first node PU and the low voltage terminal under the control of the blank area reset signal inputted by the blank area reset terminal RESET.

When the gate driving unit shown in FIG. 4 of the present disclosure is in operation, the display period include an output phase of a corresponding stage of gate driving unit, the output circuit 15 controls to output the first clock signal CK to the gate driving signal output terminal OUT, so that OUT outputs a high level, and a gate line in a corresponding row is controlled to enable; and under the control of the touch reset signal inputted by EN_Touch, the touch reset circuit 16 controls to reset the gate driving signal outputted by the gate driving signal output terminal OUT; under the control of the blank area reset signal inputted by the blank area reset terminal RESET, the first node reset circuit 17 controls to reset the gate driving signal outputted by the gate driving signal output terminal OUT.

When the touch reset transistor included in the touch reset circuit 16 is an n-type transistor, in the touch time period (the latch time period may include the touch time period), EN_Touch outputs a high level, so that the touch reset transistor is turned on to control OUT to output a low voltage signal and control a gate line in the corresponding row to disable.

When the touch reset transistor included in the touch reset circuit 16 is a p-type transistor, in the touch time period (the latch time period may include the touch time period), EN_Touch outputs a low level, so that the touch reset transistor is turned on to control OUT to output a low voltage signal and control the gate line in a corresponding row to disable When the first node reset transistor included in the first node reset circuit 17 is an n-type transistor, in the blanking time period (the blank time period is between two adjacent frames of the display time), RESET outputs a high level, so that the first node reset transistor is turned on to control OUT to connect to a low voltage.

When the first node reset transistor included in the first node reset circuit 17 is a p-type transistor, in the blanking time period, RESET outputs a low level, so that the first node reset transistor is turned on to control OUT to connect to a low voltage.

In specific implementation, enable the gate line in a corresponding row means: the transistor that is included in the pixel circuit and whose gate electrode is connected to the gate line in the corresponding row is turned on; disable the gate line in the corresponding row means: the transistor that is included in the pixel circuit and whose gate electrode is connected to the gate line in the corresponding row is turned off.

Specifically, the energy storage circuit may include a storage capacitor, the output circuit may include an output transistor, the touch reset circuit may include a touch reset transistor, and the first node reset circuit may include a first node reset transistor.

A first end of the storage capacitor is connected to the first node, and a second end of the storage capacitor is connected to the gate driving signal output terminal.

A control electrode of the output transistor is connected to the first node, a first electrode of the output transistor is connected to the first clock signal terminal, and a second electrode of the output transistor is connected to the gate driving signal output terminal.

A control electrode of the touch reset transistor is connected to the touch reset terminal, a first electrode of the touch reset transistor is connected to the gate driving signal output terminal, and a second electrode of the touch reset transistor is connected to the reset voltage terminal.

A control electrode of the first node reset transistor is connected to the blank area reset terminal, a first electrode of the first node reset transistor is connected to the first node, and a second electrode of the first node reset transistor is connected to the reset voltage terminal.

Specifically, the gate driving unit according to the embodiment of the present disclosure may further include a first node control circuit, a second node control circuit, and an output reset circuit.

The first node control circuit is respectively connected to the first node, the input terminal, the reset terminal, the first scan voltage terminal, the second scan voltage terminal, the second node, and the second voltage terminal, and is used to control the connection between the first node and the first scan voltage terminal under the control of the input signal, and control the connection between the first node and the second scan voltage terminal under the control of the reset signal inputted by the reset terminal, and control the connection between the first node and the second voltage terminal under the control of the voltage of the second node.

The second node control circuit is respectively connected to the first node, the second node, the second clock signal terminal, the gate driving signal output terminal, and the second voltage terminal, and is configured to control the potential of the second node under the control of the second clock signal inputted by the second clock signal terminal, the voltage of the first node, and the gate driving signal outputted by the gate driving signal output terminal.

The output reset circuit is respectively connected to the second node, the gate driving signal output terminal and the second voltage terminal, and is used to control the connection between the gate driving signal output terminal and the second voltage terminal under the control of the voltage of the second node.

In specific implementation, the second node controls to reset the gate driving signal outputted by the gate driving signal output terminal, and the second node is also used to reset the first node. That is, when the potential of the second node is a valid level, the gate driving signal output terminal outputs an invalid level, and the potential of the first node is an invalid level, but not limited to this.

In specific implementation, the first scan voltage terminal and the second scan voltage terminal are used to control a scanning direction; the input terminal is connected to the gate driving signal output terminal of an adjacent previous stage of gate driving unit, the reset terminal is connected to the gate driving signal output terminal of an adjacent next stage of gate driving unit.

When performing forward scanning, that is, sequentially scanning backward from the first stage of gate driving unit, the first scanning voltage inputted by the first scanning voltage terminal is the valid voltage, and the second scanning voltage inputted by the second scanning voltage terminal is an invalid voltage.

When performing reverse scanning, that is, scanning forward from the last stage of gate driving unit, the first scanning voltage inputted by the first scanning voltage terminal is an invalid voltage, and the second scanning voltage inputted by the second scanning voltage terminal is a valid voltage.

In specific implementation, the second voltage terminal may be a low voltage terminal or a ground terminal, but is not limited to this.

In specific implementation, the second node control circuit is used to control the potential of the second node, and the output reset circuit is used to reset the gate driving signal outputted by the gate driving signal output terminal under the control of the voltage of the second node.

In actual operation, the first clock signal and the second clock signal are timing control signals outputted by each stage of gate driving unit. In the display period, the potential of the first clock signal and the potential of the second clock signal are a high voltage alternately.

Figure 5:
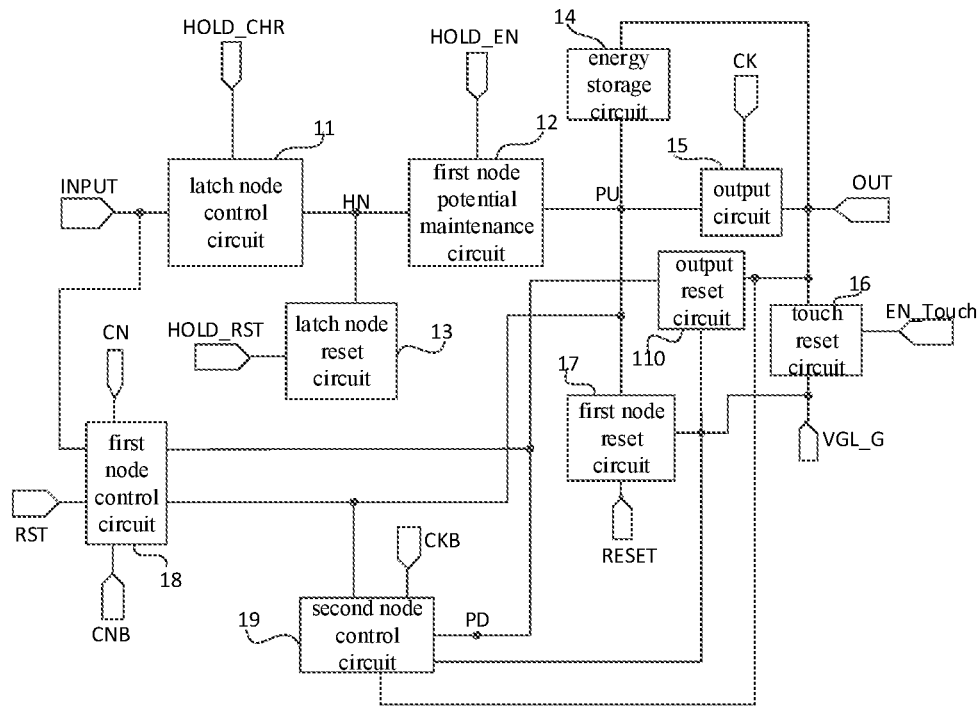
FIG. 5 is still yet another structural diagram of a gate driving unit according to an embodiment of the disclosure.

As shown in FIG. 5, on the basis of the gate driving unit shown in FIG. 4, the gate driving unit according to the embodiment of the present disclosure may further include a first node control circuit 18 and a second node control circuit 19 and an output reset circuit 110.

The first node control circuit 18 is connected to the first node PU, the input terminal INPUT, the reset terminal RST, the first scan voltage terminal CN, the second scan voltage terminal CNB, the second node PD, and the low voltage terminal VGL_G for inputting a low voltage respectively, is used to control the connection between the first node PU and the first scan voltage terminal CN under the control of the input signal, and control the connection between the first node PU and the second scan voltage terminal CNB under the control of the reset signal inputted by the reset terminal RST, and control the connection between the first node PU and the low voltage terminal under the control of the voltage of the second node PD.

The second node control circuit 19 is connected to the first node PU, the second node PD, the second clock signal terminal for inputting the second clock signal CKB, the gate driving signal output terminal OUT and the low voltage terminal respectively, is used to control the potential of the second node PD under the control of the second clock signal CKB inputted by the second clock signal terminal, the voltage of the first node PU, and the gate driving signal outputted by the gate driving signal output terminal OUT.

The output reset circuit 110 is respectively connected to the second node PD, the gate driving signal output terminal OUT, and the low voltage terminal, and is used to control the connection between the gate driving signal output terminal OUT and the low voltage terminal under the control of the voltage of the second node PD.

Specifically, the first node control circuit may include an input transistor, a reset transistor, and a first node control transistor.

A control electrode of the input transistor is connected to the input terminal, a first electrode of the input transistor is connected to the first scan voltage terminal, and a second electrode of the input transistor is connected to the first node.

A control electrode of the reset transistor is connected to the reset terminal, a first electrode of the reset transistor is connected to the first node, and a second electrode of the reset transistor is connected to the second scan voltage terminal.

A control electrode of the first node control transistor is connected to the second node, a first electrode of the first node control transistor is connected to the first node, and a second electrode of the first node control transistor is connected to the second voltage terminal.

Specifically, the second node control circuit may include a first control transistor, a second control transistor, a third control transistor, and a second node control capacitor.

A control electrode of the first control transistor and a first electrode of the first control transistor are both connected to the second clock signal terminal, and a second electrode of the first control transistor is connected to the second node.

A control electrode of the second control transistor is connected to the first node, a first electrode of the second control transistor is connected to the second node, and a second electrode of the second control transistor is connected to the second voltage terminal.

A control electrode of the third control transistor is connected to the gate driving signal output terminal, a first electrode of the third control transistor is connected to the second node, and a second electrode of the second control transistor is connected to the second voltage terminal.

A first end of the second node control capacitor is connected to the second node, and a second end of the second node control capacitor is connected to the second voltage terminal.

Specifically, the output reset circuit may include an output reset transistor.

A control electrode of the output reset transistor is connected to the second node, a first electrode of the output reset transistor is connected to the gate driving signal output terminal, and a second electrode of the output reset transistor is connected to the second voltage terminal.

In the following, a specific embodiment is used to illustrate the gate driving unit of the present disclosure.

Figure 6:
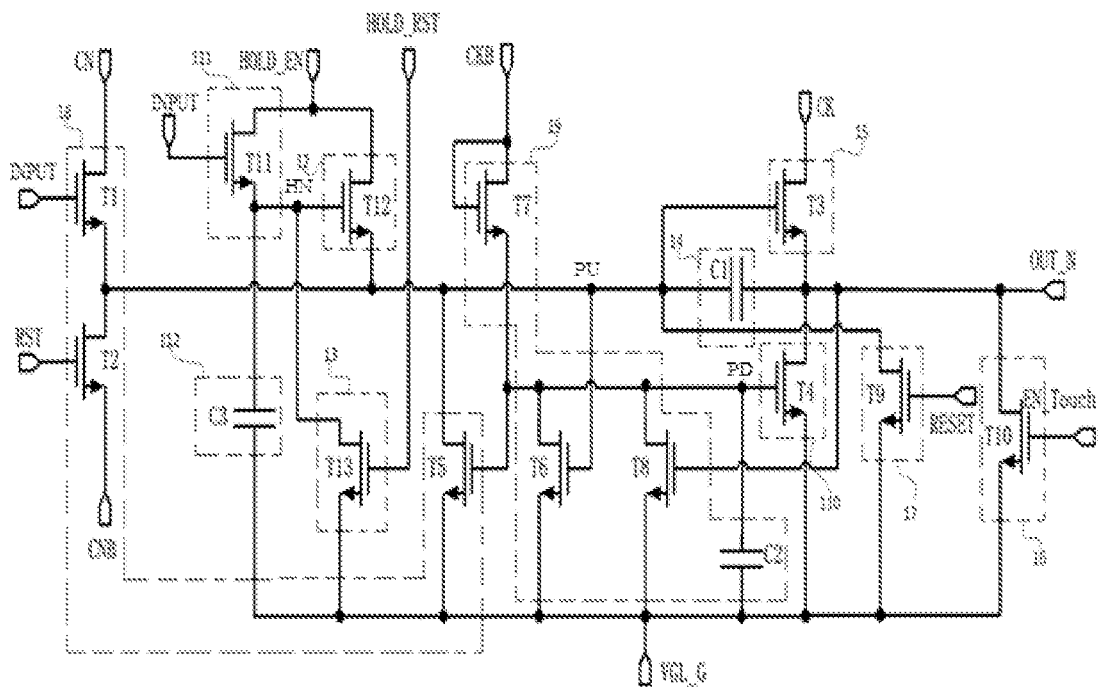
FIG. 6 is another circuit diagram of a gate driving unit according to an embodiment of the present disclosure.

As shown in FIG. 6, a specific embodiment of the gate driving unit of the present disclosure includes an input terminal INPUT, a latch node control circuit, a first node potential maintenance circuit 12, a latch node reset circuit 13, and a gate driving signal output terminal OUT, an energy storage circuit 14, an output circuit 15, a touch reset circuit 16, a first node reset circuit 17, a first node control circuit 18, a second node control circuit 19, and an output reset circuit 110.

The latch node control circuit includes a charge control circuit 111 and a latch energy storage circuit 112.

The charging control circuit 111 includes a charging control transistor T11; the latch energy storage circuit 112 includes a latch capacitor C3; the first node potential maintenance circuit 12 includes a potential maintenance transistor T12; the latch node reset circuit 13 includes a latch node reset transistor T13.

A first end of the latch capacitor C3 is connected to the latch node HN, and a second end of the latch capacitor C3 is connected to the low voltage terminal; the low voltage terminal is used to input the low voltage VGL_G.

A gate electrode of the charge control transistor T11 is connected to the input terminal INPUT, a drain electrode of the charge control transistor T11 is connected to the latch enable terminal HOLD_EN, and a source electrode of the charge control transistor T11 is connected to the latch node HN.

A gate electrode of the potential maintenance transistor T12 is connected to the latch node HN, a drain electrode of the potential maintenance transistor T12 is connected to the latch enable terminal HOLD_EN, and a source electrode of the potential maintenance transistor T12 is connected to the first Node PU.

A gate electrode of the latch node reset transistor T13 is connected to the latch node reset terminal HOLD_RST, a drain electrode of the latch node reset transistor T13 is connected to the latch node HN, and a source electrode of the latch node reset transistor T13 is connected to the low voltage terminal; the low voltage terminal is used to input the low voltage VGL_G.

The energy storage circuit 14 includes a storage capacitor C1, the output circuit 15 includes an output transistor T3, the touch reset circuit 16 includes a touch reset transistor T10, and the first node reset circuit 17 includes a first node reset transistor T9.

A first end of the storage capacitor C1 is connected to the first node PU, and a second end of the storage capacitor C1 is connected to the gate driving signal output terminal OUT.

A gate electrode of the output transistor T3 is connected to the first node PU, a drain electrode of the output transistor T3 is connected to the first clock signal terminal, and a source electrode of the output transistor T3 is connected to the gate driving signal output terminal OUT; the first clock signal terminal is used to input the first clock signal CLK.

A gate electrode of the touch reset transistor T10 is connected to the touch reset terminal EN_Touch, a drain electrode of the touch reset transistor T10 is connected to the gate driving signal output terminal OUT, and a source electrode of the touch reset transistor T10 is connected to the low voltage terminal.

A gate electrode of the first node reset transistor T9 is connected to the blank area reset terminal RESET, a drain electrode of the first node reset transistor T9 is connected to the first node PU, and a source electrode of the first node reset transistor T9 is connected with the low voltage terminal.

The first node control circuit 18 includes an input transistor T1, a reset transistor T2, and a first node control transistor T5.

A gate electrode of the input transistor T1 is connected to the input terminal INPUT, a drain electrode of the input transistor T1 is connected to the first scan voltage terminal CN, and a source electrode of the input transistor T1 is connected to the first node PU.

A gate electrode of the reset transistor T2 is connected to the reset terminal RST, a drain electrode of the reset transistor T2 is connected to the first node PU, and a source electrode of the reset transistor T2 is connected to the second scan voltage terminal CNB.

A gate electrode of the first node control transistor T5 is connected to the second node PD, a drain electrode of the first node control transistor T5 is connected to the first node PU, and a source electrode of the first node control transistor T5 is connected to the low voltage terminal.

The second node control circuit 19 includes a first control transistor T7, a second control transistor T6, a third control transistor T8 and a second node control capacitor C2.

A gate electrode of the first control transistor T7 and a drain electrode of the first control transistor T7 are both connected to the second clock signal terminal, and a source electrode of the first control transistor T7 is connected to the second node PD.

A gate electrode of the second control transistor T6 is connected to the first node PU, a drain electrode of the second control transistor T6 is connected to the second node PD, and a source electrode of the second control transistor T6 is connected to the low voltage terminal.

A gate electrode of the third control transistor T8 is connected to the gate driving signal output terminal OUT, a drain electrode of the third control transistor T8 is connected to the second node PD, and a source electrode of the third control transistor T8 is connected to the low voltage terminal.

A first end of the second node control capacitor C2 is connected to the second node PD, and a second end of the second node control capacitor C2 is connected to the low voltage terminal.

The output reset circuit 110 includes an output reset transistor T4.

A gate electrode of the output reset transistor T4 is connected to the second node PD, a drain electrode of the output reset transistor T4 is connected to the gate driving signal output terminal OUT, and a source electrode of the output reset transistor T4 is connected to the low voltage terminal.

In the specific embodiment shown in FIG. 6, the latch enabling terminal and the latch charging terminal are the same terminal.

In the specific embodiment shown in FIG. 6, all the transistors are n-type thin film transistors, but not limited to this.

The following example illustrates the working process of the gate driving circuit in the forward scan mode. In the forward scan, CN inputs a high level and CNB inputs a low level.

Figure 7:
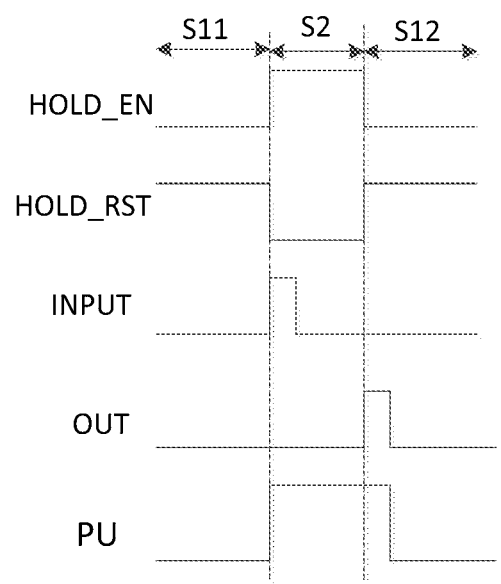
FIG. 7 is a timing diagram of the gate driving unit according to an embodiment of the present disclosure.

As shown in FIG. 7, when the gate driving unit shown in FIG. 6 of the present disclosure is in operation, a latch time period S2 is set between the first display period S11 and the second display period S12, In the latch time period S2, HOLD_EN outputs a high level, HOLD_RST outputs a low level, and INPUT is connected to the gate driving signal outputted by the adjacent previous stage of gate driving unit.

In the latching time period S2, CK is kept at a low level, so that even if the potential of PU is at a high level, OUT continues to output a low level to control the corresponding gate line to disable.

In the latch time period S2, HOLD_RST outputs a low level, and T13 is turned off.

At the beginning of the latch period S2, INPUT is connected to a high level, T1 and T11 are turned on, CN inputs a high level, and C1 is charged through T1, so that the potential of PU is a high level; at the same time HOLD_EN inputs a high level, C3 is charged through T11 to control the potential of HN to be a high level, T12 is turned on, and C1 is charged by the high level inputted by HOLD_EN through T12, so that the potential of PU is a high level.

In the latching time period S2, after INPUT is connected to a high level, INPUT is connected to a low level, the potential of HN is maintained as a high voltage by C3, T12 continues to be turned on, and HOLD_EN is controlled to connect with the first node PU, and C1 is charged by the high level inputted by HOLD_EN through T12, so that the potential of the first node PU is a high voltage, so that after the latch time period ends, and when the next display period starts, the potential of the first node can be maintained at a high voltage to enable normal display driving.

In the latch time period S2, although the leakage path of C1 through T5 and T9 still exists, the high voltage inputted by HOLD_EN can control to continue to charge C1, so that the potential of the first node PU is stably clamped at a high potential without any attenuation, so that after the latch time period ends, when the second display period S12 is started, CK is restored to a normal clock signal, the gate driving unit can output the gate driving signal normally, and the GOA can output in a plurality of stages manner.

The gate driving unit according to the embodiment of the present disclosure can ensure that at the breakpoint position of GOA, the potential of the first node in the gate driving unit can be maintained as a valid voltage for a long time through a powerful potential latch function of HOLD_EN on C1. This solves the problem that the traditional GOA has a weak interruption self-holding ability, and avoids the abnormal display caused by the GOA abnormal interruption.

When the gate driving unit shown in FIG. 6 of the present disclosure is in operation, as shown in FIG. 7, in the first display period S11 and the second display period S12, CK is restored to a normal clock signal, HOLD_EN inputs a low level, HOLD_RST outputs a high level, T13 is turned on, the discharging path of the C3 is open, C3 is discharged to reset the potential of the latch node HN, so that the potential of the latch node HN is a low voltage, to control T12 to be turned off.

The gate driving method according to the embodiment of the present disclosure is applied to the above-mentioned gate driving unit, a latch time period is provided between two adjacent display periods, and the gate driving method includes the following steps.

In the latch time period, the latch node control circuit controls the voltage of the latch node to be a valid level by latching the charging voltage inputted by the charging terminal under the control of the input signal provided by the input terminal; the first node potential maintenance circuit controls the connection between the first node and the latch enable terminal to maintain the potential of the first node at a valid voltage under the control of the voltage of the latch node.

In the display period, the latch node reset circuit controls to reset the potential of the latch node under the control of the latch node reset signal inputted by the latch node reset terminal to control the potential of the first node potential maintenance circuit to disconnect the first node from the latch enable terminal.

In the gate driving method according to the embodiment of the present disclosure, the latch time period is set between two adjacent display periods, the latch node control circuit controls the voltage of the latch node to a valid level at the input terminal. The first node potential maintenance circuit maintains the potential of the first node to be a valid voltage, so that in the latch time period, the potential of the first node can be maintained as a valid voltage, so as to implement the normal display in the display period after the latch time period; and in the display period, the latch node reset circuit controls to reset the potential of the latch node to control the first node potential maintenance circuit to disconnect the first node from the latch enable terminal, thereby not affecting the normal display.

In a specific implementation, the latch node control circuit may include a charging control circuit and a latch energy storage circuit. The latch node control circuit latches the charging voltage inputted by the charging terminal under the control of the input signal provided by the input terminal, to control the voltage of the latch node to a valid level includes: under the control of the input signal, the charging control circuit controls the connection between the latch charging terminal and the latch node, so as to charge the latch energy storage circuit through the charging voltage to control the voltage of the latch node to be an valid level.

In specific implementation, the gate driving unit may include a gate driving signal output terminal and an output circuit, and the gate driving method may further include the following steps.

In the latch time period, the output circuit controls the connection between the gate driving signal output terminal and the first clock signal terminal under the control of the first node, so that the gate driving signal output terminal outputs an invalid level to control the gate line in the corresponding row to disable.

The gate driving circuit according to the embodiment of the present disclosure includes the above-mentioned A stages of gate driving units, A is an integer greater than 1.

An input terminal of an ath stage of gate driving unit is connected to a gate driving signal output terminal of the (a−1)th stage of gate driving unit; a is an integer less than or equal to A and greater than 1.

An input terminal of the first stage of gate driving unit is connected to a start voltage terminal.

The start voltage terminal is used to input a start voltage signal, and the start voltage signal is a frame start signal, which provides an input signal for the first stage of gate driving unit.

Figure 8:
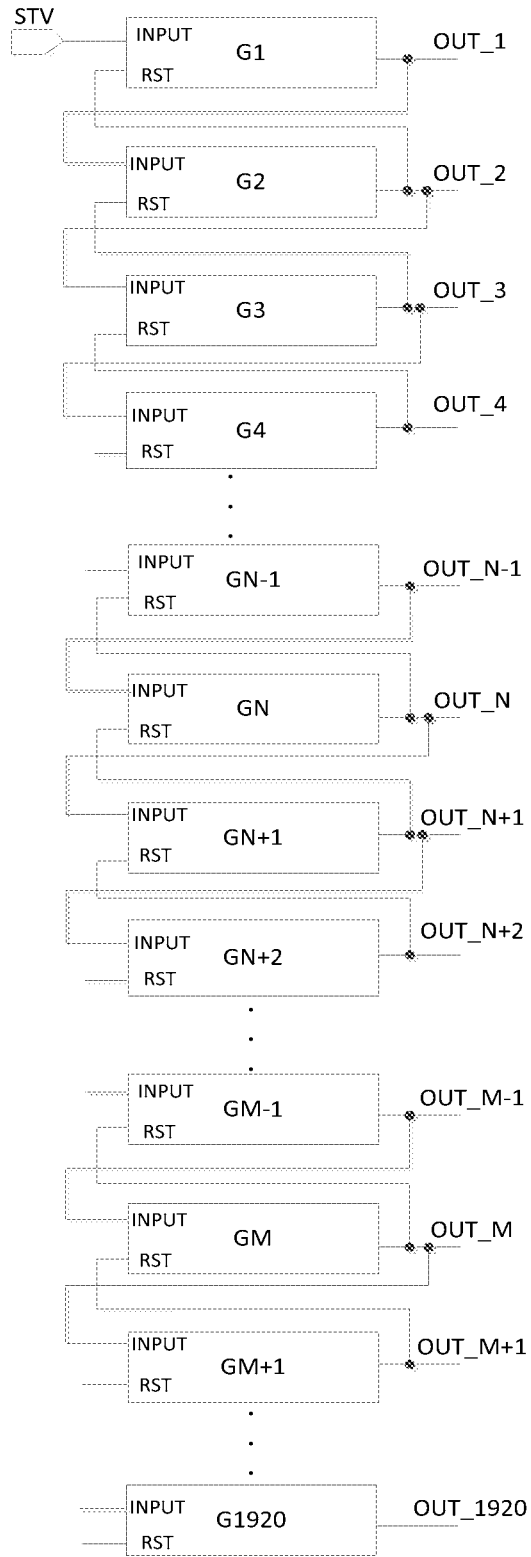
FIG. 8 is a structural diagram of a gate driving circuit according to an embodiment of the present disclosure.

As shown in FIG. 8, the gate driving circuit of the present disclosure includes 1920 stages of gate driving units.

In FIG. 8, the gate driving unit G1 is the first stage of gate driving unit, the gate driving unit G2 is the second stage of gate driving unit, the gate driving unit G3 is the third stage of gate driving unit, and the gate driving unit G4 is the fourth stage of gate driving unit, the gate driving unit GN−1 is the (N−1)th stage of gate driving unit, the gate driving unit GN is the Nth stage of gate driving unit, and the gate driving unit GN+1 is the (N+1)th stage of gate driving unit, the gate driving unit GN+2 is the (N+2)th stage of the gate driving unit, the gate driving unit GM−1 is the (M−1)th stage of gate driving unit, and the gate driving unit GM is the Mth stage of gate driving unit, the gate driving unit GM+1 is the (M+1)th stage of gate driving unit, the gate driving unit G1920 is the 1920th stage of gate driving unit.

The terminal STV is the starting voltage terminal, the terminal OUT_1 is a first gate driving signal output terminal, the terminal OUT_2 is a second gate driving signal output terminal, and the terminal OUT_3 is a third gate driving signal output terminal, the terminal OUT_4 is a fourth gate driving signal output terminal; OUT N−1 is the (N−1)th stage of gate driving signal output terminal, and OUT N is the Nth stage of gate driving signal output terminal, OUT N+1 is the (N+1)th stage of gate driving signal output terminal, OUT N+2 is the (N+2)th stage of gate driving signal output terminal, OUT_M−1 is the (M−1)th stage of gate driving signal output terminal, OUT_M is the Mth stage of gate driving signal output terminal, OUT_M+1 is the (M+1)th stage of gate driving signal output terminal, and OUT 1920 is the 1920th stage of gate driving signal output terminal.

The gate driving signal output terminal of stage N+1 is marked OUT N+1, the gate driving signal output terminal of stage N+2 is marked OUT N+2, and the gate driving signal output terminal of stage OUT_M−1 is M−1 stage. Gate driving signal output terminal, marked OUT_M is the gate driving signal output terminal of the Mth stage, marked OUT_M+1 is the gate driving signal output terminal of the M+1 stage, and marked OUT_1920 is the gate driving signal output terminal of the 1920th stage Polar drive signal output terminal.

N is an integer greater than 5, M is an integer greater than N+3.

INPUT is the input terminal, and RST is the reset terminal.

The input terminal of G1 is connected to STV, the reset terminal of G1 is connected to OUT_2, the input terminal of G2 is connected to OUT_1, the reset terminal of G2 is connected to OUT_3, the input terminal of G3 is connected to OUT_2, the reset terminal of G3 is connected to OUT_4, the input terminal of G4 is connected to OUT_3, the reset terminal of G4 is connected to the gate driving signal output terminal of the fourth stage of gate driving unit (not shown in FIG. 8); the input terminal of GN−1 is connected to the gate driving signal output terminal of the (N−2)th stage of gate driving unit (not shown in FIG. 8), the reset terminal of GN−1 is connected to OUT N; the input terminal of GN is connected to OUT N−1, and the reset terminal of GN is connected to OUT N+1; the input terminal of GN+1 is connected to OUT N, the reset terminal of GN+1 is connected to OUT N+2, the input terminal of GN+2 is connected to OUT N+1, and the reset terminal of GN+2 is connected to the gate driving signal output terminal of the (N+3)th stage of gate driving unit (not shown in FIG. 8); the input terminal of GM−1 is connected to the gate driving signal output terminal of the (M−2)th stage of gate driving unit (not shown in FIG. 8), the reset terminal of GM−1 is connected to OUT_M; the input terminal of GM is connected to OUT_M−1, the reset terminal of GM is connected to OUT_M+1; the input terminal of GM+1 is connected to OUT_M, and the reset terminal of GM+1 is connected to the gate driving signal output terminal of the (M+2)th stage of the gate driving unit (not shown in FIG. 8).

In the specific embodiment of the gate driving circuit shown in FIG. 8, a first electrode of the output transistor included in G1 is connected to the first clock signal CK, and a first electrode of the output transistor included in G2 is connected to the second clock signal CKB, a first electrode of the output transistor included in G3 is connected to the first clock signal CK, a first electrode of the output transistor included in G4 is connected to the second clock signal CKB, and a first electrode of the output transistor included in GN−1 is connected to the first clock signal CK, a first electrode of the output transistor included in GN is connected to the second clock signal CKB, a first electrode of the output transistor included in GN+1 is connected to the first clock signal CK, and a first electrode of the output transistor included in GN+2 is connected to the second clock signal CKB, a first electrode of the output transistor included in GM−1 is connected to the first clock signal CK, a first electrode of the output transistor included in GM is connected to the second clock signal CKB, a first electrode of the output transistor included in GM+1 is connected to the first clock signal CK, and the first electrode of the output transistor included in G1920 is connected to the second clock signal CKB.

Figure 9:
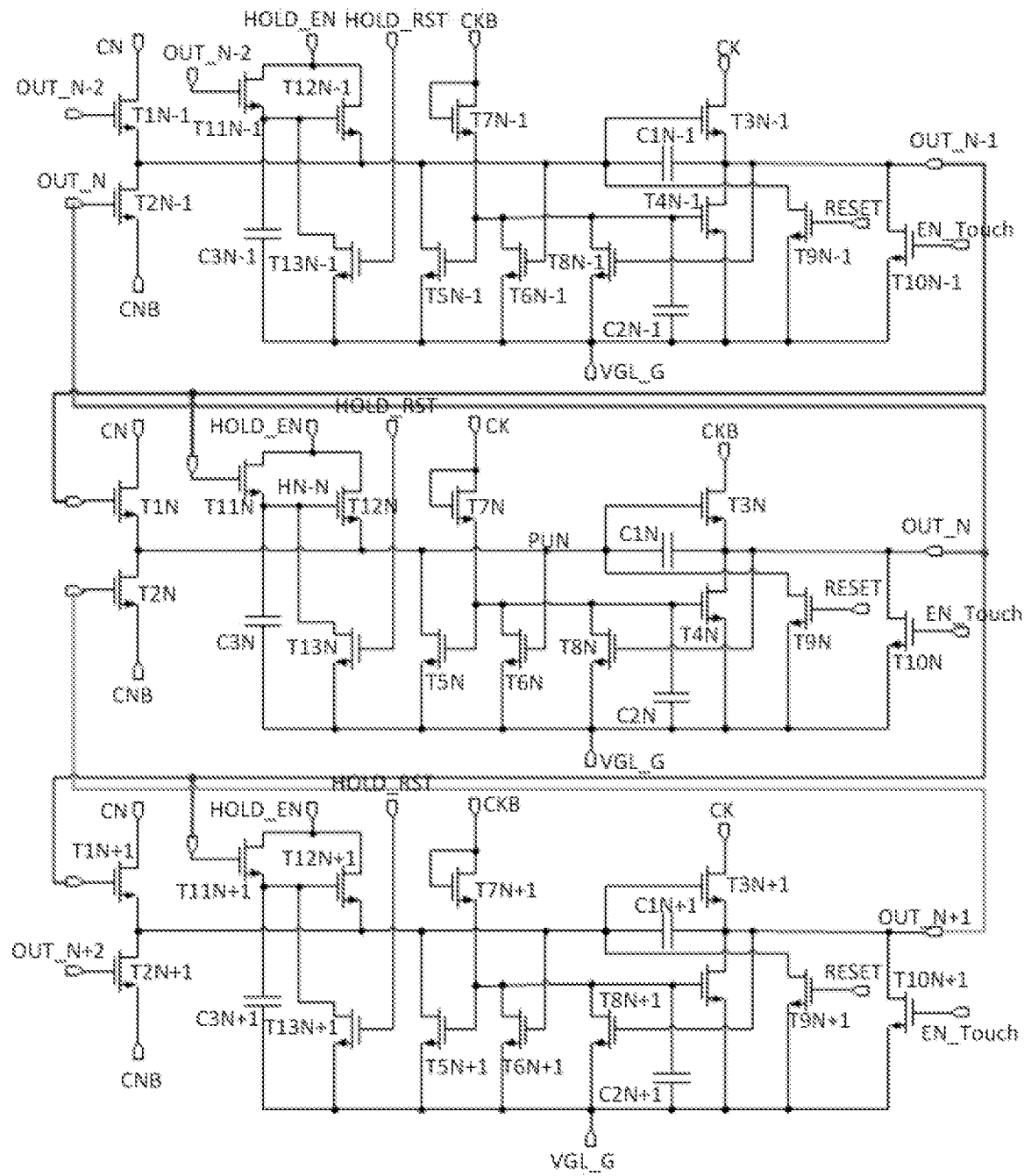
FIG. 9 is a circuit diagram of the (N−1)th stage of gate driving unit, the Nth stage of gate driving unit, and the (N+1)th stage of gate driving unit in the gate driving circuit according to an embodiment of the present disclosure.

FIG. 9 shows a circuit diagram of the (N−1)th stage of gate driving unit, the Nth stage of gate driving unit, and the (N+1)th stage of gate driving unit in the gate driving circuit of the present disclosure.

As shown in FIG. 9, the (N−1)th stage of gate driving unit includes an (N−1)th stage of input transistor T1N−1, an (N−1)th stage of reset transistor T2N−1, and an (N−1)th stage of charge control transistor T11N−1, an (N−1)th stage of latch capacitor C3N−1, an (N−1) stage of potential maintenance transistor T12N−1, an (N−1)th stage of latch node reset transistor T13N−1, and an (N−1)th stage of storage capacitor C1N−1, an (N−1)th stage of output transistor T3N−1, an (N−1)th stage of touch reset transistor T10N−1, an (N−1)th stage of first node reset transistor T9N−1, an (N−1)th stage of first node control transistor T5N−1, an (N−1)th stage of first control transistor T7N−1, an (N−1)th stage of second control transistor T6N−1, an (N−1)th stage of third control transistor T8N−1, an (N−1)th stage of second node control capacitor C2N−1 and an (N−1)th stage of output reset transistor T4N−1.

A drain electrode of T3N−1 is connected to the first clock signal CK, and a gate electrode of T7N−1 and a drain electrode of T7N−1 are both connected to the second clock signal CKB.

A gate electrode of T1N−1 and a gate electrode of T11N−1 are both connected to the gate driving signal output terminal OUT N−2 of the (N−2)th stage of gate driving unit. A drain electrode of T11N−1 and a drain electrode of T12N−1 are both connected to the latch enable terminal HOLD_EN, a gate electrode of T13N−1 is connected to the latch enable terminal HOLD_RST; a gate electrode of T10N−1 is connected to the touch reset terminal EN_Touch, and a gate electrode of T9N−1 is connected to the blank area reset terminal RESET, a gate electrode of T2N−1 is connected to OUT N.

The Nth stage of gate driving unit includes an Nth stage of input transistor T1N, an Nth stage of reset transistor T2N, an Nth stage of charge control transistor T11N, an Nth stage of latch capacitor C3N, an Nth stage of potential maintenance transistor T12N, and an Nth stage of latch node reset transistor T13N, an Nth stage of storage capacitor C1N, an Nth stage of output transistor T3N, an Nth stage of touch reset transistor T10N, an Nth stage of first node reset transistor T9N, an Nth stage of first node control transistor T5N, an Nth stage of first control transistor T7N, an Nth stage of second control transistor T6N, an Nth stage of third control transistor T8N, an Nth stage of second node control capacitor C2N, and an Nth stage of output reset transistor T4N.

A drain electrode of T3N is connected to the first clock signal CKB, and a gate electrode of T7N and a drain electrode of T7N are both connected to the second clock signal CK.

A gate electrode of T1N and a gate electrode of T11N are both connected to the gate driving signal output terminal OUT N−1 of the N−1th stage of gate driving unit, and a drain electrode of T11N and a drain electrode of T12N are both connected to the latch enable terminal HOLD_EN, a gate electrode of T13N is connected to the latch enable terminal HOLD_RST; a gate electrode of T10N is connected to the touch reset terminal EN_Touch, a gate electrode of T9N is connected to the blank area reset terminal RESET, and a gate electrode of T2N is connected to OUT N+1.

The (N+1)th stage of gate driving unit includes an (N+1)th stage of input transistor T1N+1, an (N+1)th stage of reset transistor T2N+1, an (N+1)th stage of charge control transistor T11N+1, an (N+1)th stage of latch capacitor C3N+1, an (N+1)th stage of potential maintenance transistor T12N+1, an (N+1)th stage of latch node reset transistor T13N+1, an (N+1)th stage of storage capacitor C1N+1, an (N+1)th stage of output transistor T3N+1, an (N+1)th stage of touch reset transistor T10N+1, an (N+1)th stage of first node reset transistor T9N+1, an (N+1)th stage of first node control transistor T5N+1, an (N+1)th stage of the first control transistor T7N+1, an (N+1)th stage of the second control transistor T6N+1, an (N+1)th stage of the third control transistor T8N+1, an (N+1)th stage of the second node control capacitor C2N+1 and an (N+1)th stage of output reset transistor T4N+1.

A drain electrode of T3N+1 is connected to the first clock signal CK, and a gate electrode of T7N+1 and a drain electrode of T7N+1 are both connected to the second clock signal CKB.

A gate electrode of T1N+1 and a gate electrode of T11N+1 are both connected to the gate driving signal output terminal OUT N of the Nth stage of gate driving unit. A drain electrode of T11N+1 and a drain electrode of T12N+1 are both connected to the latch enable terminal HOLD_EN, a gate electrode of T13N+1 is connected to the latch enable terminal HOLD_RST; a gate electrode of T10N+1 is connected to the touch reset terminal EN_Touch, a gate electrode of T9N+1 is connected to the blank area reset terminal RESET, a gate electrode of T2N+1 is connected to OUT N+2. OUT N+2 is the gate driving signal output terminal of the (N+2)th stage of gate driving unit.

In FIG. 9, CN is the first scan voltage terminal, CNB is the second scan voltage terminal, and VGL_G is the low voltage.

In the specific embodiment shown in FIG. 9, all the transistors are n-type thin film transistors, but not limited to this.

In the specific embodiment shown in FIG. 9, HN-N is the latch node in the Nth stage of gate driving unit, and PUN is the first node in the Nth stage of gate driving unit.

The following describes the operation process of the gate driving circuit of the present disclosure during forward scanning. During forward scanning, CN inputs a high level and CNB inputs a low level; during reverse scanning, CN inputs a low level, CNB input a high level.

Figure 10:
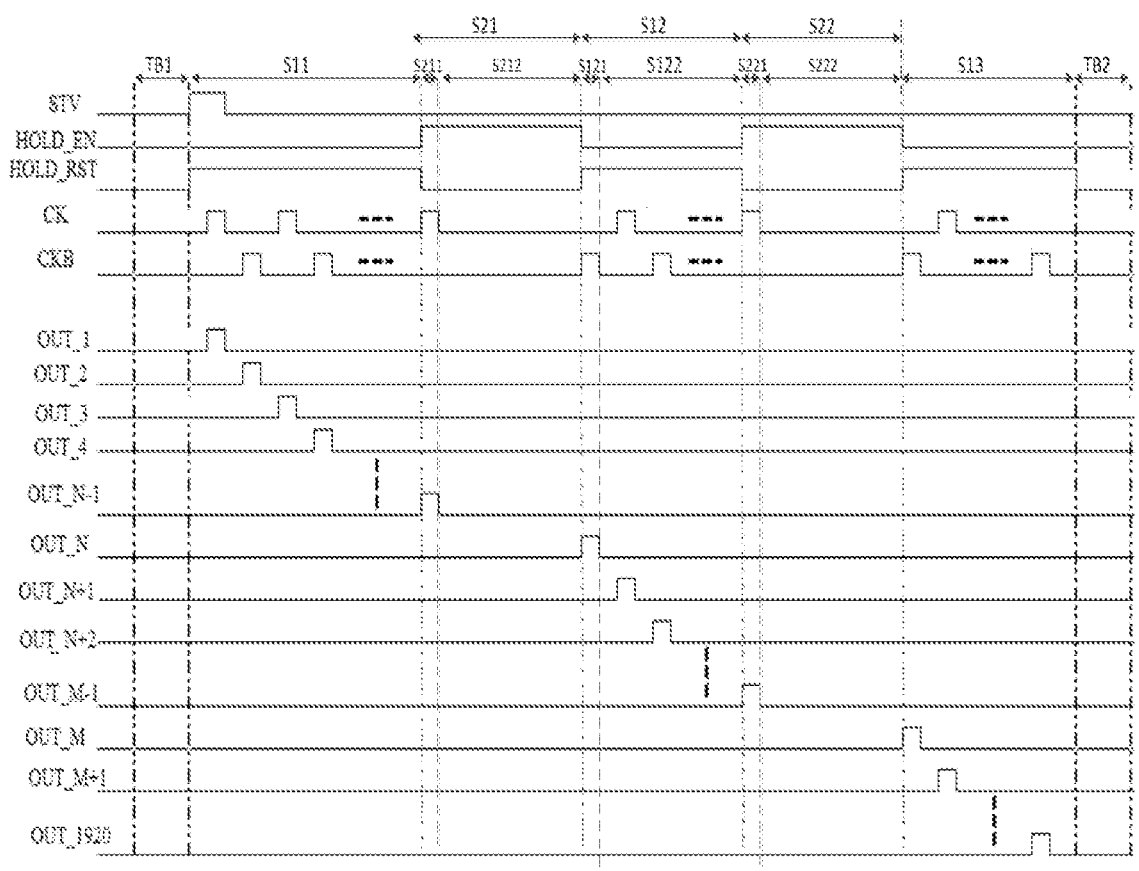
FIG. 10 is a working timing diagram of the gate driving circuit according to an embodiment of the present disclosure.

As shown in FIG. 10, the frame of display time includes a first display period S11, a first latch period S21, a second display period S12, a second latch period S22, and a third display period S13 that are sequentially set. The first latch period S21 includes a first latch phase S211 and a second latch phase S212; the second display period S12 includes a first display phase S121 and a second display phase S122; a second latch time period S22 includes a third latching phase S221 and a fourth latching phase S222.

In the first display period S11, the first stage of gate driving unit G1 to the (N−2)th stage of gate driving unit are scanned subsequently, OUT_1, OUT_2, OUT_3, OUT_4 to the (N−2)th stage of gate driving signal output terminal output a high levels in sequence, and then the first latch period S21 is started.

In the first display period S11, HOLD_EN outputs a low level and HOLD_RST outputs a high level to control the latch node reset transistors in each stage of the gate driving units to be turned on, so that the potential of the latch node in eat latches in the gate driving units of each level are turned on. The potential of the latch node in each stage of gate driving unit is a low voltage, thereby controlling the charge control transistor and the potential maintenance transistor in each stage of gate driving units to be turned off.

In the first latch phase S211 included in the first latch period S21, CK is a high level, CKB is a low level, OUT N−1 outputs a high level, T1N and T11N are turned on, HOLD_EN outputs a high level signal, HOLD_RST outputs a low level signal, C1N is charged by the high level signal inputted by CN through T1N, and the C3N is charged by the high level signal outputted by HOLD_EN through T11N to control the potential of the latch node HN-N in the Nth stage of gate driving unit to be a high level and T12N is turned on.

In the second latching phase S212 included in the first latching period S21, HOLD_EN outputs a high level signal, HOLD_RST outputs a low level signal, CK and CKB are both a low level, and OUT N−1 outputs a low level. T11N is turned off, and the potential of HN-N is maintained at a high level by C3N to control T12N to be turned on. C1N is charged by the high level signal outputted by HOLD_EN through T12N to maintain the potential of PUN at a high level; and because CK is a low level, then OUT N outputs low level and GOA interruption is started.

During the GOA interruption process, HOLD_EN always outputs a high level signal, and the high level of C3N controls T12N to be always turned on. C1N is charged by the high level signal outputted by HOLD_EN through T12N to maintain the potential of PUN at a stable high level. In this process, although the leakage path of C1N through T5N and T9N still exists, the high level signal inputted by HOLD_EN can clamp the potential of PUN to a high potential stably without any attenuation. When the GOA interruption ends, CK and CKB resume to normal clock signals, so that GOA can continue to output in a plurality stages manner; through the powerful potential latch function of HOLD_EN to C1, it can ensure that at the breakpoint position, the potential of the first node in the gate driving unit can be maintained at a high level for a long time, and can be output normally after the GOA interruption ends.

In the first display phase S121 included in the second display period S12, CKB is a high level, the potential of PUN is maintained at a high level, and OUT N outputs a high level.

In the second display phase S122 included in the second display period S12, HOLD_EN outputs a low level signal, HOLD_RST outputs a high level signal, CK and CKB are a high level alternately, and OUT N+1, OUT N+2 to the gate driving signal output terminals included in the (M−2)th stage of gate driving unit sequentially output a high level, and then the second latch period S22 is started.

In the third latching phase S221 included in the second latching time period S22, CK is a high level, CKB is a low level, OUT_M−1 outputs a high level, HOLD_EN outputs a high level, and HOLD_RST outputs a low level. The potential of the first node in the Mth stage of gate driving unit is maintained at a high level by the charge control transistor, the latch capacitor and the potential maintenance transistor in the Mth stage of gate driving unit, and because CKB is a low level, OUT_M outputs a low level.

In the fourth latch phase S222 included in the second latch time period S22, HOLD_EN outputs a high level signal, HOLD_RST outputs a low level signal, CK and CKB are both a low level, and OUT_M−1 outputs a low level. The potential of the first node in the Mth stage of gate driving unit is controlled to be maintained at a high level through the latch capacitor and the potential maintenance transistor in the Mth stage of gate driving unit, and because CKB is a low level, OUT_M outputs a low level.

In the third display period S13, CKB and CK are a high level, and OUT_M, OUT_M+1 to OUT_1920 are a high level.

In FIG. 10, TB 1 is a first blank time period, and TB 2 is a second blank time period.

The display device according to the embodiment of the present disclosure includes the above-mentioned gate driving circuit.

The display device provided in at least one embodiment of the present disclosure may be any product or component with a display function such as a mobile phone, a tablet computer, a television, a display, a notebook computer, a digital photo frame, a navigator, and the like.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A gate driving unit, comprising an input terminal, a latch node control circuit, a first node potential maintenance circuit, and a latch node reset circuit, wherein
    the latch node control circuit is respectively connected to a latch node, the input terminal, and a latch charging terminal, and is configured to control a voltage of the latch node through a charging voltage inputted by the latch charging terminal under the control of an input signal provided by the input terminal,
    the first node potential maintenance circuit is respectively connected to the latch node, a first node, and a latch enable terminal, and is configured to control the connection between the first node and the latch enable terminal under the control of a voltage of the latch node, to maintain a potential of the first node; and
    the latch node reset circuit is respectively connected to a latch node reset terminal and the latch node, and is configured to control to reset the potential of the latch node under the control of the latch node reset signal inputted by the latch node reset terminal,
    wherein the gate driving unit further comprises a gate driving signal output terminal, an energy storage circuit, an output circuit, a touch reset circuit, and a first node reset circuit,
    a first terminal of the energy storage circuit is connected to the first node, a second terminal of the energy storage circuit is connected to the gate driving signal output terminal, and the energy storage circuit is configured to control the potential of the first node;
    the output circuit is respectively connected to the first node, the gate driving signal output terminal and a first clock signal terminal, and is configured to control the connection between the gate driving signal output terminal and the first clock signal terminal under the control of the voltage of the first node;
    the touch reset circuit is respectively connected to a touch reset terminal, the gate driving signal output terminal and a reset voltage terminal, and is configured to control the connection between the gate driving signal output terminal and the reset voltage terminal under the control of the touch reset signal inputted by the touch reset terminal; and
    the first node reset circuit is respectively connected to a blank area reset terminal, the first node and the reset voltage terminal, and is configured to control the connection between the first node and the reset voltage terminal under the control of a blank area reset signal inputted by the blank area reset terminal.

2. The gate driving unit according to claim 1, wherein the latch node control circuit comprises a charge control circuit and a latch energy storage circuit;
    a first terminal of the latch energy storage circuit is connected to the latch node, and a second terminal of the latch energy storage circuit is connected to a first voltage terminal;
    the charging control circuit is respectively connected to the input terminal, the latch charging terminal, and the latch node, and is configured to control the connection between the latch charging terminal and the latch node under the control of the input signal, so as to charge the latch energy storage circuit through the charging voltage to control the voltage of the latch node.

3. The gate driving unit according to claim 2, wherein the latch energy storage circuit comprises a latch capacitor; the charge control circuit comprises a charge control transistor;
    a first end of the latch capacitor is connected to the latch node, and a second end of the latch capacitor is connected to the first voltage terminal; and
    a control electrode of the charging control transistor is connected to the input terminal, a first electrode of the charging control transistor is connected to the latch charging terminal, and a second electrode of the charging control transistor is connected to the latch node.

4. The gate driving unit according to claim 1, wherein the first node potential maintenance circuit comprises a potential maintenance transistor;
    a control electrode of the potential maintenance transistor is connected to the latch node, a first electrode of the potential maintenance transistor is connected to the latch enable terminal, and a second electrode of the potential maintenance transistor is connected to the first node.

5. The gate driving unit according to claim 1, wherein the latch node reset circuit comprises a latch node reset transistor;
    a control electrode of the latch node reset transistor is connected to the latch node reset terminal, a first electrode of the latch node reset transistor is connected to the latch node, and a second electrode of the latch node reset transistor is connected to the reset voltage terminal.

6. The gate driving unit according to claim 1, wherein the latch charging terminal and the latch enabling terminal are a same terminal.

7. The gate driving unit according to claim 1, wherein the energy storage circuit comprises a storage capacitor, the output circuit comprises an output transistor, the touch reset circuit comprises a touch reset transistor, and the first node reset circuit comprises a first node reset transistor;
    a first end of the storage capacitor is connected to the first node, and a second end of the storage capacitor is connected to the gate driving signal output terminal;
    a control electrode of the output transistor is connected to the first node, a first electrode of the output transistor is connected to the first clock signal terminal, and a second electrode of the output transistor is connected to the gate driving signal output terminal;
    a control electrode of the touch reset transistor is connected to the touch reset terminal, a first electrode of the touch reset transistor is connected to the gate driving signal output terminal, and a second electrode of the touch reset transistor is connected to the reset voltage terminal; and a control electrode of the first node reset transistor is connected to the blank area reset terminal, a first electrode of the first node reset transistor is connected to the first node, and a second electrode of the first node reset transistor is connected to the reset voltage terminal.

8. The gate driving unit according to claim 1, further comprising a first node control circuit, a second node control circuit, and an output reset circuit, wherein, the first node control circuit is respectively connected to the first node, the input terminal, a reset terminal, a first scan voltage terminal, a second scan voltage terminal, a second node, and a second voltage terminal, and is configured to control the connection between the first node and the first scan voltage terminal under the control of the input signal, and control the connection between the first node and the second scan voltage terminal under the control of a reset signal inputted by the reset terminal, and control the connection between the first node and the second voltage terminal under the control of a voltage of the second node;

the second node control circuit is respectively connected to the first node, the second node, a second clock signal terminal, a gate driving signal output terminal, and a second voltage terminal, and is configured to control a potential of the second node under the control a the second clock signal inputted by the second clock signal terminal, the voltage of the first node, and the gate driving signal outputted by the gate driving signal output terminal; and the output reset circuit is respectively connected to the second node, the gate driving signal output terminal and the second voltage terminal, and is configured to control the connection between the gate driving signal output terminal and the second voltage terminal under the control of the voltage of the second node.

9. A gate driving method applied to the gate driving unit according to claim 1, and a latch time period is provided between two adjacent display periods, the gate driving method comprises:

in the latch time period, controlling, by the latch node control circuit, the voltage of the latch node to a valid level by latching the charging voltage inputted by the charging terminal under the control of the input signal provided by the input terminal; controlling, by the first node potential maintenance circuit, the connection between the first node and the latch enable terminal to maintain the potential of the first node at a valid voltage under the control of the voltage of the latch node;

in the display period, controlling, by the latch node reset circuit, to reset the potential of the latch node under the control of the latch node reset signal inputted by the latch node reset terminal to control the potential of the first node potential maintenance circuit to disconnect the first node from the latch enable terminal.

10. The gate driving method according to claim 9, wherein the latch node control circuit comprises a charging control circuit and a latch energy storage circuit, the controlling, by the latch node control circuit, the voltage of the latch node to a valid level by latching the charging voltage inputted by the charging terminal under the control of the input signal provided by the input terminal includes: controlling, by the charging control circuit, the connection between the latch charging terminal and the latch node under the control of the input signal, to charge the latch energy storage circuit through the charging voltage to control the voltage of the latch node to be a valid level.

11. The gate driving method according to claim 9, wherein the gate driving unit comprises a gate driving signal output terminal and an output circuit, and the gate driving method further comprises:

in the latch period, controlling, by the output circuit, the connection between the gate driving signal output terminal and the first clock signal terminal under the control of the first node, so that the gate driving signal output terminal outputs an invalid level to control a gate line in a corresponding row to disable.

12. A gate driving circuit comprising A stages of the gate driving units according to claim 1; A is an integer greater than 1;

an input terminal of an ath stage of gate driving unit is connected to a gate driving signal output terminal of an (a−1)th stage of gate driving unit; a is an integer less than or equal to A and greater than 1;

an input terminal of a first stage of gate driving unit is connected to a start voltage terminal.

13. A display device comprising the gate driving circuit according to claim 12.

14. A gate driving unit, comprising an input terminal, a latch node control circuit, a first node potential maintenance circuit, and a latch node reset circuit, wherein the latch node control circuit is respectively connected to a latch node, the input terminal, and a latch charging terminal, and is configured to control a voltage of the latch node through a charging voltage inputted by the latch charging terminal under the control of an input signal provided by the input terminal, the first node potential maintenance circuit is respectively connected to the latch node, a first node, and a latch enable terminal, and is configured to control the connection between the first node and the latch enable terminal under the control of a voltage of the latch node, to maintain a potential of the first node; and the latch node reset circuit is respectively connected to a latch node reset terminal and the latch node, and is configured to control to reset the potential of the latch node under the control of the latch node reset signal inputted by the latch node reset terminal, wherein the gate driving unit further includes a first node control circuit, a second node control circuit, and an output reset circuit, wherein, the first node control circuit is respectively connected to the first node, the input terminal, a reset terminal, a first scan voltage terminal, a second scan voltage terminal, a second node, and a second voltage terminal, and is configured to control the connection between the first node and the first scan voltage terminal under the control of the input signal, and control the connection between the first node and the second scan voltage terminal under the control of a reset signal inputted by the reset terminal, and control the connection between the first node and the second voltage terminal under the control of a voltage of the second node;

the second node control circuit is respectively connected to the first node, the second node, a second clock signal terminal, a gate driving signal output terminal, and a second voltage terminal, and is configured to control a potential of the second node under the control a the second clock signal inputted by the second clock signal terminal, the voltage of the first node, and the gate driving signal outputted by the gate driving signal output terminal; and the output reset circuit is respectively connected to the second node, the gate driving signal output terminal and the second voltage terminal, and is configured to control the connection between the gate driving signal output terminal and the second voltage terminal under the control of the voltage of the second node.

* * * * *